US005517555A

United States Patent [19]
Amadon et al.

[11] Patent Number: 5,517,555
[45] Date of Patent: May 14, 1996

[54] REAL TIME INFORMATION SYSTEM FOR CELLULAR TELEPHONES

[75] Inventors: Charles G. Amadon, Seattle; David M. Stanhope, Tacoma; Robert R. Millward; Michael A. Edmonds, both of Seattle, all of Wash.

[73] Assignee: Cellular Technical Services Company, Inc., Seattle, Wash.

[21] Appl. No.: 310,216

[22] Filed: Sep. 21, 1994

Related U.S. Application Data

[63] Continuation of Ser. No. 807,456, Dec. 12, 1991, abandoned.

[51] Int. Cl.$^6$ .............................. H04M 11/00; H04Q 7/22
[52] U.S. Cl. ............................... 379/59; 379/58; 379/112; 379/114; 379/145
[58] Field of Search .................................. 379/58, 59, 63, 379/91, 111, 112, 113, 114, 144, 145

[56] References Cited

U.S. PATENT DOCUMENTS

| | | |
|---|---|---|
| 3,725,947 | 4/1973 | Albertini et al. . |
| 3,808,537 | 4/1974 | Sarati et al. . |
| 4,515,994 | 5/1985 | Bolle et al. . |
| 4,640,986 | 2/1987 | Yotsutani et al. . |
| 4,776,000 | 10/1988 | Parienti . |
| 4,776,003 | 10/1988 | Harris . |
| 4,777,646 | 10/1988 | Harris . |
| 4,831,647 | 5/1989 | D'Avello et al. . |
| 4,833,702 | 5/1989 | Shitara et al. . |
| 4,860,341 | 8/1989 | D'Avello et al. . |
| 4,935,956 | 6/1990 | Hellwarth et al. . |
| 4,945,556 | 7/1990 | Namekawa . |
| 4,951,308 | 8/1990 | Bishop et al. . |
| 4,958,368 | 9/1990 | Parker . |
| 4,965,821 | 10/1990 | Bishop et al. . |
| 4,975,942 | 12/1990 | Zebryk . |
| 5,027,388 | 6/1991 | Bradshaw et al. . |
| 5,109,401 | 4/1992 | Hattori et al. ................... 379/91 X |
| 5,144,649 | 9/1992 | Zicker et al. ....................... 379/59 |
| 5,345,595 | 9/1994 | Johnson et al. ................. 455/33.1 |

FOREIGN PATENT DOCUMENTS 01226266  9/1989  Japan .

OTHER PUBLICATIONS

Telephony, "Railroad Riders Can Now Make and Get Calls on Train", vol. 176 #5—Feb. 1, 1969.
Cellular Technical Services Co. Brochure entitled "Breakthrough for Cellular Carriers: Turn your escaping minutes into profits!" (limited distribution, Jan. 1989).
Tranz 330 Installation Guide, published by VeriFone, Inc. Technical Publications Group, 100 Kahelu Avenue, Mililani, HI 96789 (published Feb. 1990, 16 pages).

Primary Examiner—Curtis Kuntz
Assistant Examiner—G. J. Oehling
Attorney, Agent, or Firm—Graybeal Jackson Haley & Johnson

[57] ABSTRACT

Method and apparatus for collecting call detail, monitoring customer account balance for excessive charges, and controlling the capabilities of cellular subscriber stations on the cellular telephone switch in substantially real time is disclosed. A communication system co-located at a cellular MTSO is used to capture detailed call information by examining the switch's Automated Message Accounting data in real-time. Call records are parsed, rated for toll and air charges and stored in a database. A software system monitors the billing activity on the customer account for excessive charges. When excessive charges take place, a connection between the communication system and the cellular telephone switch control port allows commands to be issued directly from the communication system to the cellular telephone switch providing operational control of selected cellular telephones.

17 Claims, 17 Drawing Sheets

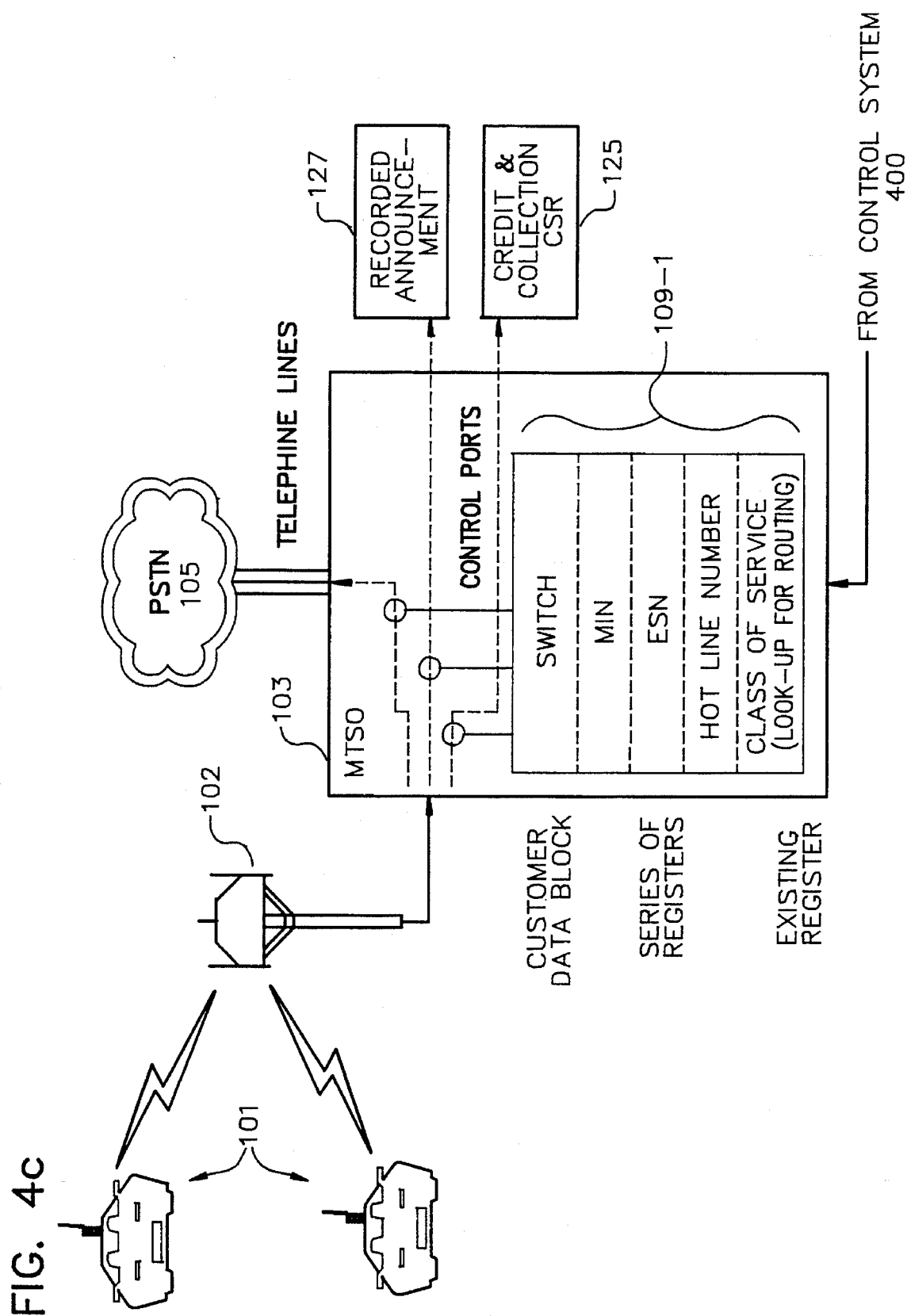

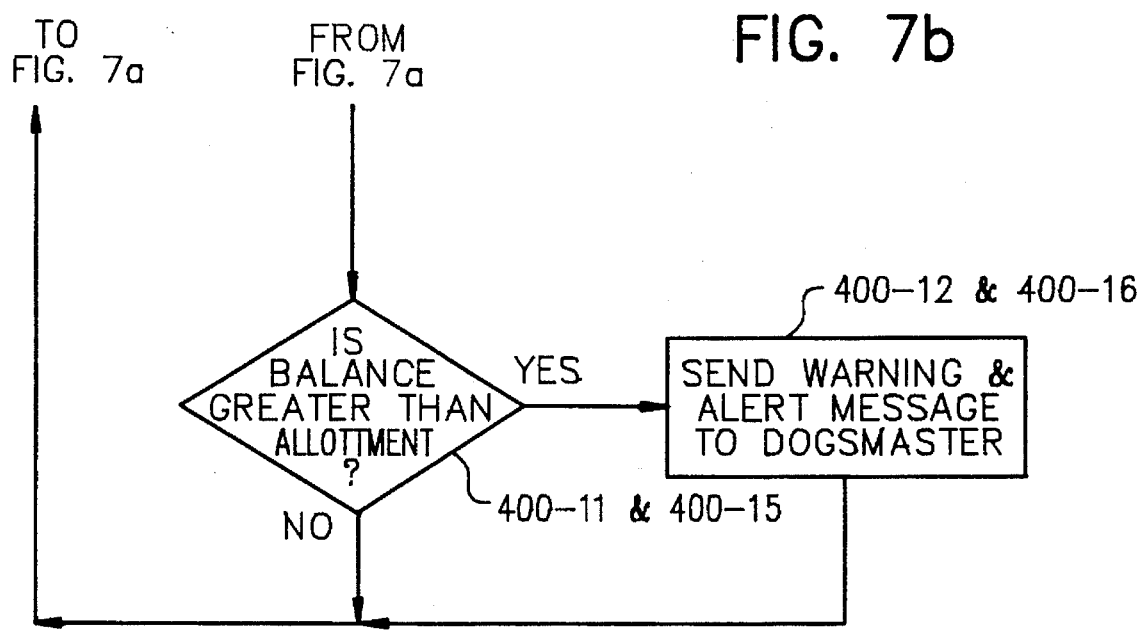

REAL TIME INFORMATION SYSTEM FOR CELLULAR TELEPHONES

This application is a continuation of application Ser. No. 07/807,456 (now abandoned), filed Dec. 12, 1991, the benefit of the filing dates of which are hereby claimed under 35 USC 120.

BACKGROUND OF THE INVENTION

The business of providing cellular telephone service has been fraught with bad debt and cash flow problems. These problems have been so severe that they have limited profit margins for some cellular carrier companies and limited the customer base to demonstrably credit worthy, even though the demand for their service has remained high.

There are two primary reasons for the difficulties in providing cellular telephone service.

First, the cellular telephone service carrier companies must deal with a cash flow problem which is beyond their control. This is due to a billing cycle that is much too long to exercise any effective control over customer payment. The cellular telephone service carriers do not receive full account call detail and toll billing on a more frequent basis than once per month. At that point, it is possible for very high bills to have been accrued by customers, deliberately or inadvertently. In the case of the former, the bill is often never paid, which amounts to fraud. In the case of the latter, the customer is not prepared to pay the bill, which leads to a long payment cycle and suspension of service to the customer. The data is generally provided on paper and sometimes magnetic tape. The information remains unavailable until the end of a batch cycle, which prevents a minute by minute inspection of call detail. At this point the information is batch processed, usually after the billing month is over. Generally, a cellular company received revenue from customers one month after the service was first provided.

Secondly, the inability to distinguish valid from invalid cellular telephone numbers allows for cellular telephone fraud.

Without this timely account balance information or a means of determining that a cellular telephone number is a valid one, cellular telephone service carriers have no expedient means of data analysis, resulting in effective control over when a cellular telephone is operable and when it is not.

Related cellular telephone systems are disclosed in U.S. Pat. No. 5,301,223 and PCT US91/03583 also owned by the assignee of this application.

SUMMARY OF THE INVENTION

This document describes the invention, a computer based system that greatly reduces the bad debt problems that frequently occur in providing cellular telephone service to a large subscriber base with a lengthy billing cycle. The real-time usage information and control system, including customer-specific credit limit control, is provided to distinguish between registered and non-registered telephone numbers and give cellular mobile telephone carriers information about the charges that their customers are incurring in substantially real time, as they happen. When a customer is registered in the control system, he or she is allotted an account balance that, when exceeded, causes certain computer initiated action steps to be taken. Depending upon the monitoring or watch option, this account balance is either a maximum account balance per billing cycle, or in the case of having access to payment data, a running balance that incorporates payments and credits to the balance. This information is used by the control system to determine what action to take on the customer's account. If the customer exceeds the allotted maximum, the carrier has three options for action; 1) suspending service via a mechanism for controlling a standard cellular phone's ability to make calls on demand by issuing appropriate commands to a cellular telephone switch, thereby eliminating potential fraud, 2) contacting the customer to confirm payment, or 3) routing the customer originated calls to customer service/credit and collections department.

The control system is a hardware and software system designed to examine the call record and calculate charges for the call. When a cellular call is made, the routing information is passed to the Mobile Telephone Switching Office (MTSO) switch, which connects the origination number and the destination number of the call. The switch at the MTSO receives the cellular call transaction request and makes a record of it. In the preferred embodiment, the call information is recorded by an applications processor interfacing with the automatic message accounting module of the MTSO and rated for toll (long distance) charges. Then the call record passes on to a database subsystem. There, the control system stores the data and uses it to monitor and analyze, such as by a comparison operation, the balance information of each customer account registered on the system. This information is held in a database and in memory and used by the control system (and by extension the cellular carrier) to keep a customer from exceeding a reasonable account balance without some intervention on the part of the Cellular carrier, either a suspension of service or reroute calls to a contact with customer service to confirm payment. Additionally, in the office of the cellular carrier, terminals connected to the database of the usage information and control system give office personnel real time, up-to-the-minute access to the call information, and printers generate paper copies of the reports and billing, which may include printed bills.

These and further features, objects and advantages of the invention will become apparent to those skilled in the art from the following detailed description and appended drawings.

BRIEF DESCRIPTION OF THE DRAWINGS

The following are descriptions of the illustrative diagrams of the control system contained in this document.

FIG. 4a, 4b and 4c are functional block and flow diagrams of the interface of the system of FIG. 2 with the MTSO.

FIGS. 7a and 7b are the program flowchart for a program called WATCHDOG, a portion of the system of FIG. 5.

DESCRIPTION OF THE PREFERRED EMBODIMENTS

Figure 1:
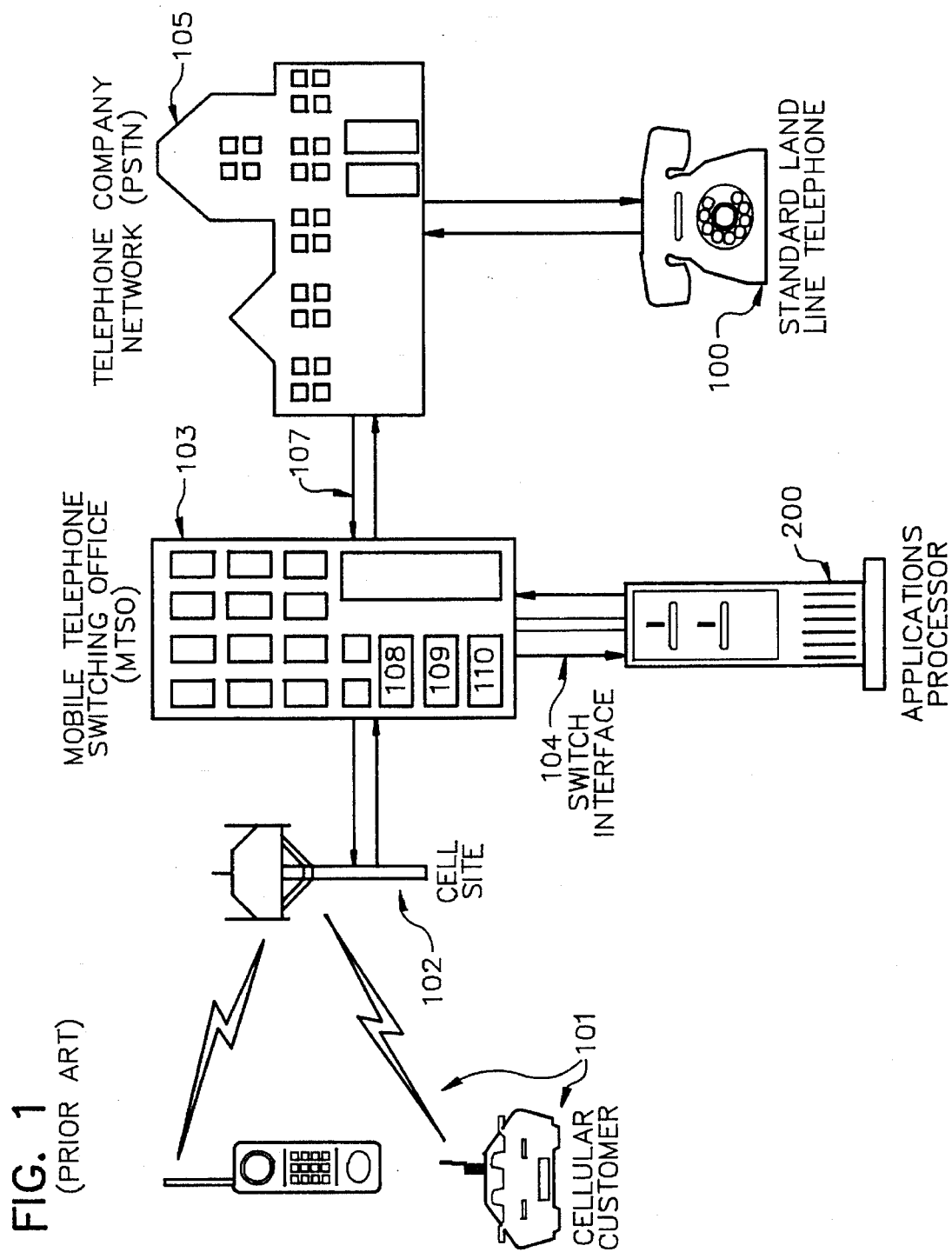
FIG. 1 is a pictorial diagram of a cellular telephone system.
Figures 2, 3A:
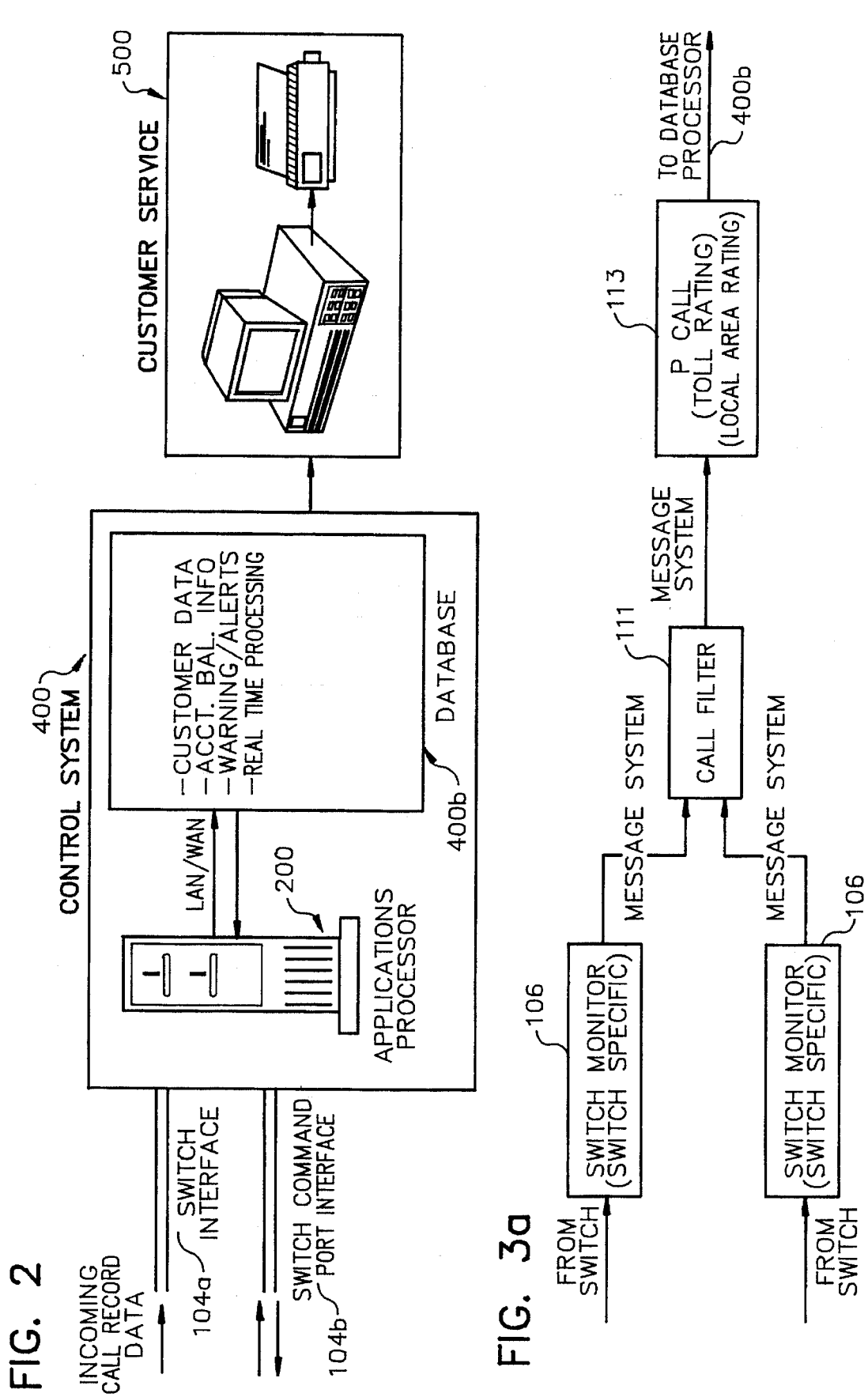
FIG. 2 is a general schematic diagram of an applications processor and database processor that together interface with the MTSO switch and provide the real-time usage information and control system of the invention.
FIG. 3a and 3b are general functional block and flow diagrams, respectively, of the system interface with the MTSO.
Figure 5:
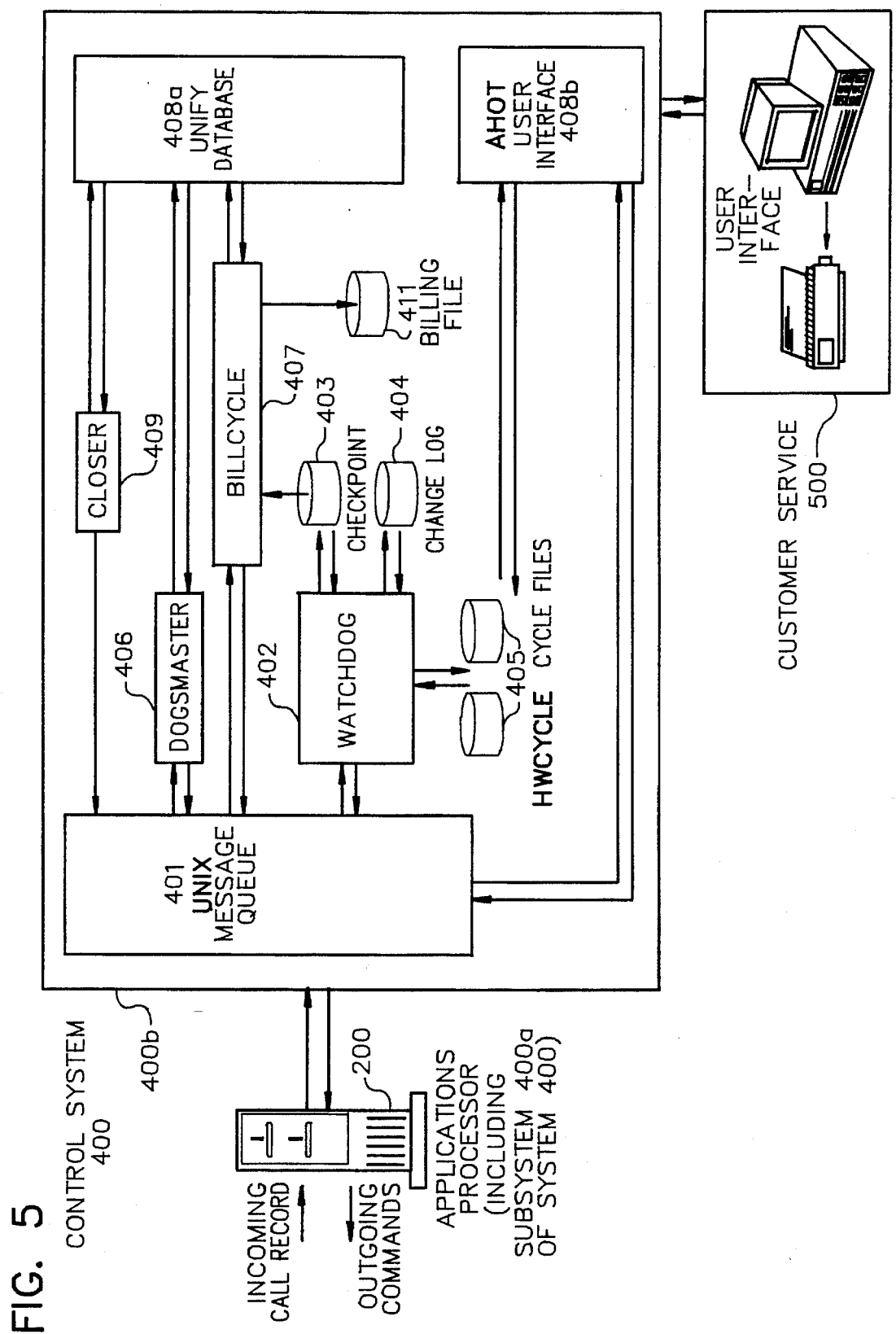
FIG. 5 is a detailed block diagram of the applications processor and database processor subsystems of the system of FIG. 2.

The real-time usage information and control system (400) is a combination of hardware and software information systems shown in FIGS. 2 and 5 for cooperating with a cellular system shown in FIG. 1. The hardware of the system is comprised of one or more high speed computers running the UNIX operating system. There may be more than one computer if desired, but the least number of computers required is one. Information and control system (400) must be able to run at very high speeds, so as to avoid backlog of records; this allows the control system to be a real-time processor. "Real-time" as used herein means substantially real time in a range of not greater than 5 minutes, and is measured from the instant a raw data call record is generated and available from the automated message accounting module of the MTSO or other switch. A "real time" information and control system (400) operating in accordance with this invention is available to the cellular industry under the trademark "HOTWATCH", owned by the assignee of this application.

Cellular System

The Federal Communications Commission (FCC), which controls and regulates the cellular communication industry, is responsible for granting licenses required to operate cellular systems. The FCC has divided the country into a number of geographical areas. To encourage competition the FCC has decreed that there be two cellular telephone carriers in each geographical area. The FCC has further specified that one carrier must be a wire line, or standard phone service provider, and the other must be a non-wireline provider.

Cellular carriers provide cellular system for each geographical area licensed. The cellular system serves to interconnect a cellular telephone subscriber with other cellular subscribers or with standard telephones.

The cellular system, FIG. 1 (prior art) schematically illustrates a typical system installed and maintained by a cellular carrier. These are three major parts to a cellular telephone system: cellular subscriber stations (101); cellular base stations (or cell sites) (102); and a Mobile Telephone Switching Office (MTSO) (103).

The subscriber stations (101) are standard portable or mobile telephones, each consisting of a standard transceiver, handset and antenna.

Cellular base stations (102) are arranged adjacent areas called cells. The base stations are responsible for setting up and maintaining calls placed to and from subscriber stations in their respective cells, "handing off" calls to neighboring cell sites as subscribers move and communicating call progress with the MTSO (103).

The MTSO consists of a telephone Switching System (103) with network connections to cellular base stations (102) and trunk lines (107) to and from the Public Switched Telephone Network (PSTN) (105) that in turn connect to standard phones (100). Examples of known cellular telephone switches are the Autoplex 1000 from AT&T and the Motorola 2500. It is the function of the MTSO to maintain a database of subscribers and subscriber features, track the progress of calls made to or from subscribers and record call detail for billing purposes.

The mobile telephone switching system (103) is a computer which has three general programs: a switch network program (108), system control program (109) and an automatic message accounting program (110).

The switch network management program (108) manages the inter-connection of subscriber stations (101) and the PSTN (105).

The system control program (109) provides functions to maintain the database of subscriber stations (101). Access to the maintenance functions is provided through asynchronous terminal connections in a known manner.

The automatic message accounting program (110) delivers the call record having data for billing purposes. The method of delivery for the call detail varies from switch to switch. Some switches (103) only provide the data by storing it on magnetic tape drives. Others provide a synchronous connection utilizing some layers of the known CCITT X.25 protocol in addition to magnetic tape drives. Still others provide asynchronous ASCII connections.

Real-Time Usage Information and Control System

The interfaces for the real-time useage information and control system of the present invention include switch interface (104) which is a specialized hardware adapter from ports on the system hardware to any of the AT&T, Ericsson, Motorola or compatible switches and operates in conjunction with applications processor (200). This allows the control system (400) the capability of communicating with practically every hardware switching system that cellular carriers use, through a link that can communicate over any other LAN or WAN system (TCP, Novell, async. or synchronous).

The applications processor (200) is here a multi-purpose processor and is programmed uniquely for the present invention to serve as an interface and to perform certain preprocessing of call records from the switch and to send commands to the switch. The applications processor identifies customers to be watched and does the first portion of the call rating, assigning the toll (long distance) charges to the call record. It has two types of interfaces to the switch.

Figures 1, 3B:
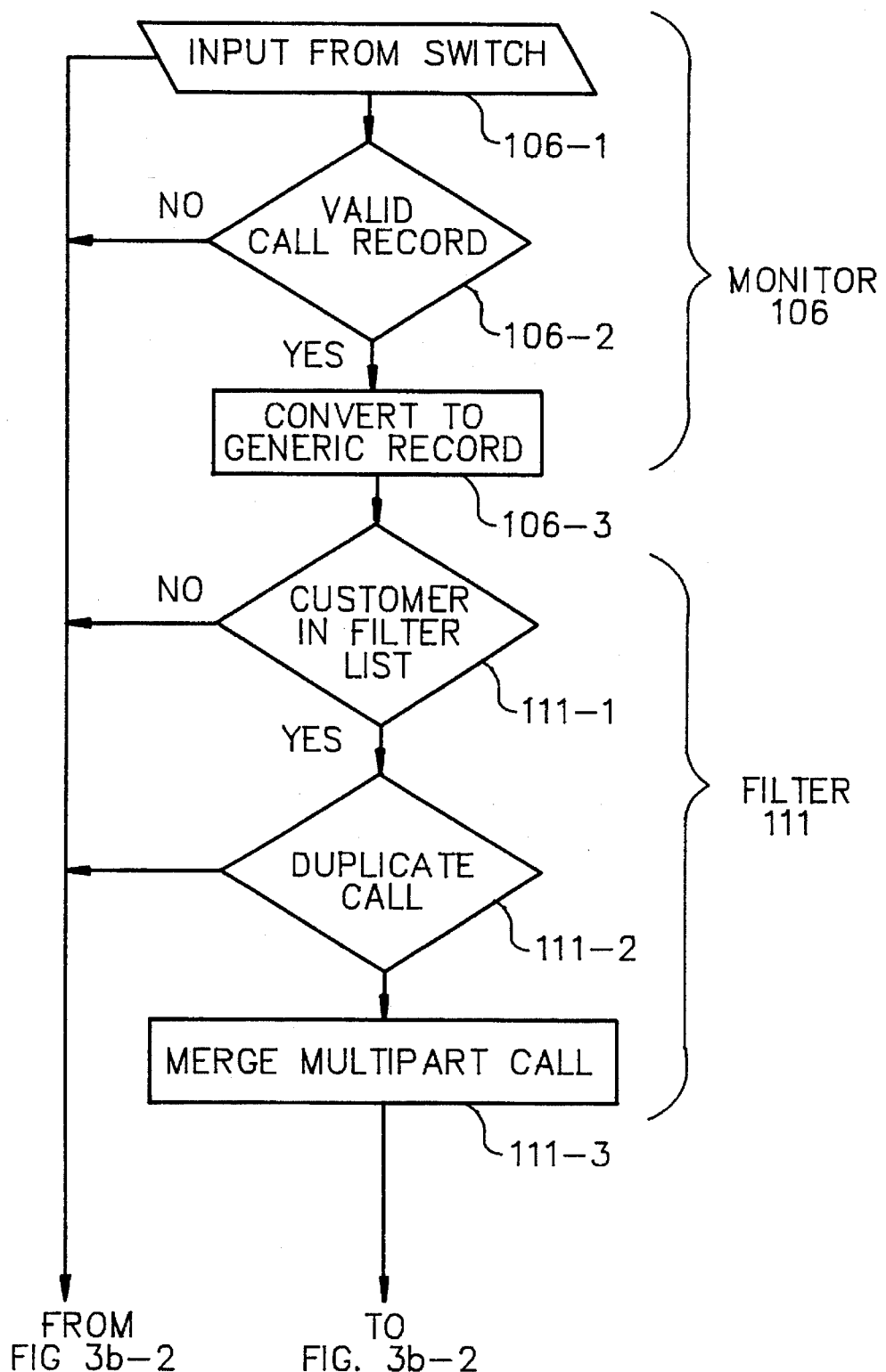
Figures 2, 3B:
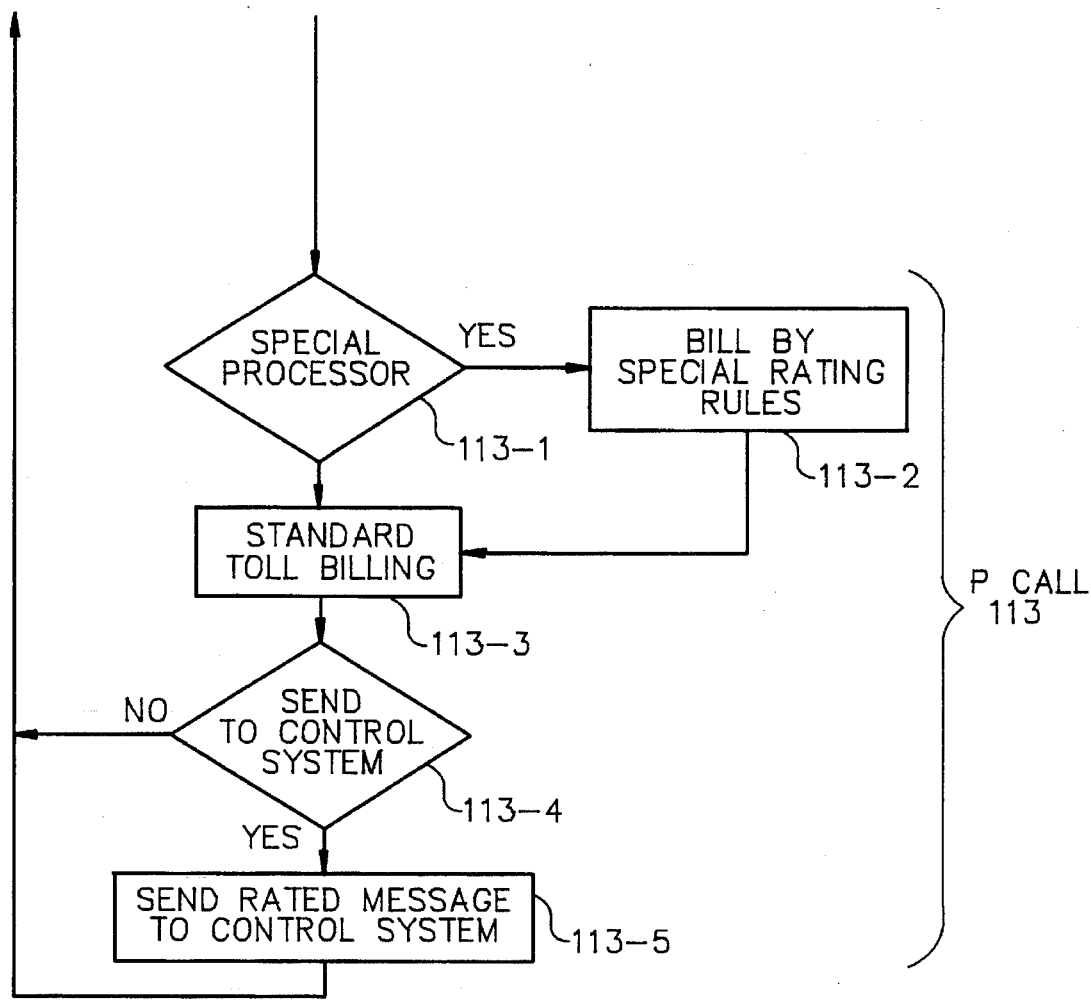

The call record interface is provided by one or more switch monitors (106) that are switch specific hardware and software modules, as shown in FIG. 3a, which receive call records from the switch at call termination. For certain types of calls intermediate records may be received during the call. The switch specific module converts these records to a generic call record format. These generic records are then sent via message queues to a call filter (111) program. The call filter joins the various pieces of a multi-record call together. It also determines if the call record is for a client of interest. If not, the record(s) is/are dropped. Checks are made for duplicate records, and if any, they are dropped. The call filter then passes the call, via the message queues, to a Pcall (113) process for rating. The process rates toll based on industry standard toll rating tables as well as checking locally defined rating rules and local calling plan definitions. The rated calls then are sent to the control system application. FIGS. 3a and 3b(i) and 3b(ii) show, respectively, a functional block diagram of the interface for passing call records between the switch and the MTSO (103) and the control system for processing the call records generated at the switch. As indicated in FIG. 3a, in certain applications, multiple switch monitors are provided, each being switch specific depending upon the MTSO equipment, which has some industry variation as known per se, are used to feed call record messages through a call filter which extracts only the customer records registered on the control system and feeds those records to a toll and local area rating processor called Pcall. As more specifically shown in FIG. 3b(i) and 3b(ii), the applications processor (200) includes a program for performing the functions (106) and (111) of FIG. 3a and, as indicated, input call records (106-1) are fed through a series of blocks beginning with a test for valid call record (106-2) followed by a conversion process to convert switch specific call records to a generic or uniform format (106-3), a process known per se. This completes the function of the switch monitors (106) as indicated in FIG. 3a. Next the preprocessed call records are fed through a filtering process referred to as a call filter (111) in which a decision block determines whether the call records belong to a registered customer of the cellular service (111-1) which will include those certain customers registered on the control system. Those that are stored in a register have their call records passed to a check for duplicate call records (111-2) such as those produced when a customer passes between cells generating what appear to be two separate call records that are, in fact, one call. The record parts are joined in a merge (111-3) multi-part call block again as known per se, and the now filtered and merged call records for the customers are fed to a call rating preprocessor referred to as Pcall (113) shown in FIG. 3b(ii). In the Pcall call (113) rating, a first block (113-1) sets the rating information such as rate plan and also adds a final destination flag to the call record thereby identifying those call records that are destined for the control system (400). It is at this step that another register stores a list of customers registered in the control system, thereby distinguising the control system customers from among all customers of the cellular service which, for example, may also include rental customers. The customer call records flagged for usage control by system (400) are passed through decision block called local plan processor (113-1) to determine whether any special or local rating process is required. If yes, the record is diverted to a special processor (113-2), known per se, for rating calls according to a local billing plan of which there a number of plans known per se. If no local or special rating process is required, then the decision block passes the control system tagged call record down through the standard toll billing (113-3) for rating the call record and then passes the call record on to a decision block which looks for the control system flag (113-4). If the call record has not been flagged as a control system customer, then the call records return to the main data path at the no output (113-4). Those records flagged for the control system then pass to the block entitled send rated message of the call record to the control system (113-5) database portion of the system. At this stage, the control system record has been rated but the total charges, based on air time, have not been computed. The preprocessed rated control system call records then leave the preprocessing portion (400a) of the control system performed in this embodiment by programs in a multi-purpose applications processor (200) and enter the control system database processing portion of the system shown in FIG. 5 as 400b.

Figure 4A:
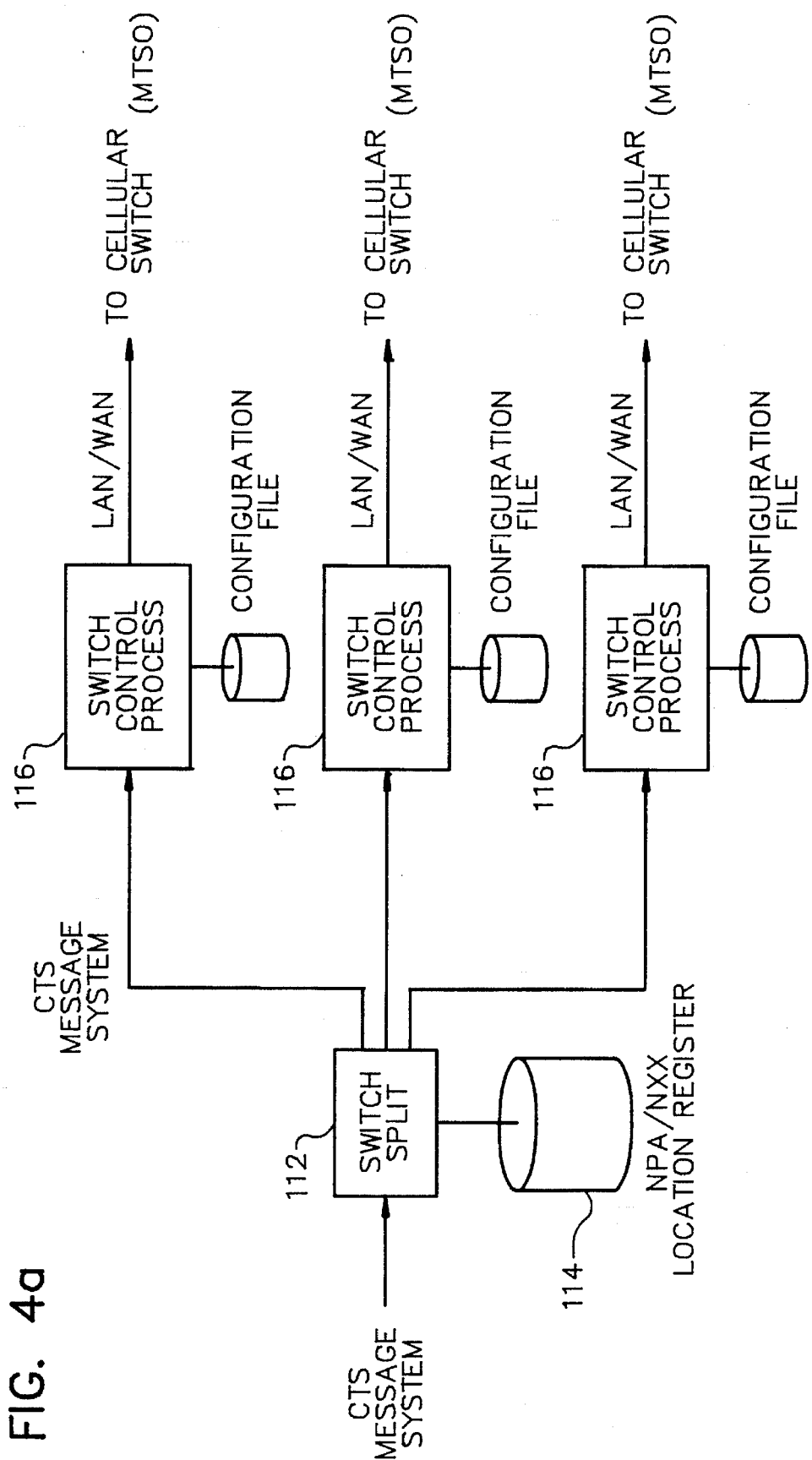
Figure 4B:
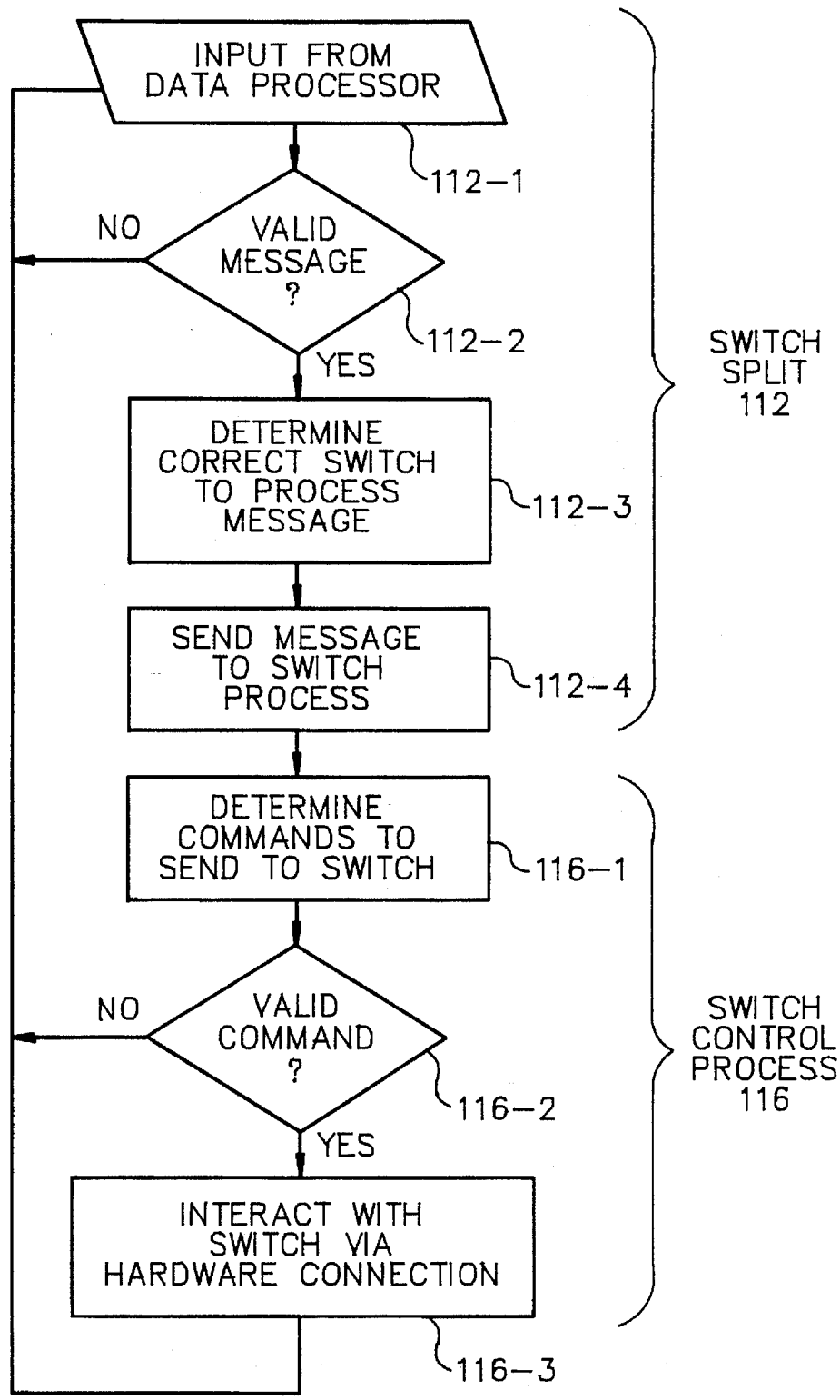

FIGS. 4a, 4b and 4c show the command interface by which system (400) commands to the MTSO to change a customer's service. When the system (400) wants to control the routing of a customer's phone it sends a message via message queues to the applications processor (200). A process on the applications processor determines in switch split (112) via a table lookup in file (114) which of multiple switch control process (116) to use and then uses a control to send switch specific commands to the MTSO switch and verify that they were received and processed correctly. If the command fails or cannot be processed at that time, they will be retried sometime later. The number of retries is configurable on a site by site basis. The configuration file allows this program to support widely different switch types. The message from the control system may specify one of many possible actions, which is translated by the switch-control-process to the appropriate switch commands.

With further reference to FIGS. 4a, 4b and 4c, the command interface to the MTSO switch for acting on control system commands such as hotlining or otherwise changing the customer's service, is shown in the form of a functional block diagram in FIG. 4a, the preferred processing performed in a program of the applications processor as shown in FIG. 4b for implementing the functions of FIG. 4a and finally, a block diagram in FIG. 4c of the subsystems in a typical MTSO switch that respond to the control system commands passed through the applications processor interface. Thus, in FIG. 4a command messages output by the control system go to a processor commonly called a switch split (112) augmented by a location register, all know per se for determining which of several switches within the MTSO contain that particular customer line. The switch split processor then distributes the control system change commands to the appropriate one of a plurality of switch controls, one for each of multiple switches, again as know per se. The selected switch control is then linked over a LAN (local area network) or WAN (wide area network), such as here provided by an RS 232 port to the appropriate switch in the MTSO for effecting the control system command. As shown in FIG. 4b, this process of interfacing commands to the switch is performed by a program in the applications processor (200) which includes receiving an input (112-1) of the command message from the control system database portion and first determining whether it is a valid command message (112-2). If yes, the applications processor makes a determination (112-3) by a lookup table which of several switch processors control that customer, and then sends the valid message to the appropriate switch process (112-4). This completes the switch split functions. Then, the control system command (116) is interpreted by the selected switch control process (116-1) and checked for validity in a decision block (116-2). If valid, a control system command is sent over the network to the switch (116-3) of the MTSO to cause a change in service as described above such as hotlining or otherwise changing the service. This all occurs as a result of the control system exercising real time usage monitoring and control. As shown in FIG. 4c, a representative functional block diagram is shown of the MTSO which, as known per se, contains a pre-existing module usually called a customer data block (109-1). Each customer has such a data block which includes the SWITCH (identification), MIN (mobile identification number or phone number), ESN (electronic serial number), a hotline number (number to which the customer line can be directed such as to a credit and collection administrative office), and a class of service (lookup table for routing calls in a manner other than the above hotline number). This module is under the control of the control system output by the interface shown in FIGS. 4a and 4b. For example, should a customer exceed the usage limit, then the control system command can either, in this case, send a command to select the hotline number which may be the credit and collection department of the administrative office, or, as another example, the class of service register may be selected, which is a program to send the call to another administative phone line having a prerecorded announcement advising the customer that his or her credit limit has been exceeded. This customer data block is, as indicated, known per se, and preexisting in the MTSO and is implemented typically by a series of registers or blocks of memory in the MTSO processor.

As shown in FIG. 5, the database subsystem (400b) of control 400 here uses a processor separate from the applications processor (which contains subsystem (400a) described above). Database subsystem (400b) and consists of a group of interactive software programs and a database on which customers are registered and usage data is stored. They are an AHOT database (408a), AHOT user interface (408b), the WATCHDOG (402), the DOGSMASTER (406), BILLCYCLE (407), and CLOSER (409) programs.

All programs operate in the UNIX operating system. The data retrieval components of the database subsystem (400b) consist of three databases, written in UNIFY's ACCEL fourth generation (ACCEL 4GL) language, a report writer defined with UNIFY's Report Writer (RPT), and SQL/DA. All other software components of the system are written in the "C" programming language.

There are three types of messages sent and received by programs in the subsystem (400b); control system messages, call records, and hotlining commands. All of the internal interactive programs communicate with each other via a messaging system (401) of a type known per se using a message queue. The messaging system (401) is a 'C' programming language interface that allows programs to communicate with each other irrespective of whether they exist on the same computer or not. For communication between different processors, the messaging system can use known networking technology available and appropriate for a specific installation. The messaging system (401) isolates the application from the actual interface hardware used, as well as providing protection features to preserve data across computer system shutdowns and restarts, as known per se.

Messages system (401) causes messages sent from one program to another in control system (400) to be placed into an area of memory commonly accessible to all programs, with header information encoded such that only the right program picks up the information; the system (401) operates such that it will wait for the first message to be received and acted upon before the next one will be sent. Database subsystem (400b) stores the bulk of its data in a master database (408a), having a list of all customers registered in the system, their names and billing addresses, stored in a UNIFY 2000 (-a tradename) relational database. The UNIFY 2000 relational database (408a) consists of customer data files including at least customer name, account #, and balance information that is updated frequently. The user interface to the UNIFY database (408a) is through AHOT (408b), such as ACCEL (-a tradename) database manager product, which uses the compiled ACCEL 4GL and form files to define data structure for the data in the database, and controls the input and output to and from the database to the user at customer service (500). Simultaneously, there are 4GL hooks to 'C' programming language functions. These hooks are used to provide AHOT (408b) with interface to both the ISAM cycle files (405) as well as the messaging system (401). Through the interface to the messaging system (401), AHOT (408b) can communicate with the other internal 'C' programs including WATCHDOG (402) and DOGSMASTER (406). The UNIFY database (408A) also provides a 'C' language interface which is used by DOGSMASTER (406) to communicate with and modify the database directly.

The current balance information for each account tracked by control system (400) is stored in the internal memory of the WATCHDOG (402) program. The "detail" information on the customer's calls, such as the length of the call, toll charges, number called, number calling from, type of call, etc., is stored on a series of ISAM "Cycle" files (405) (ISAM means Index Sequential Access Method), one such file for each cycle. The ISAM cycle files (405) are the permanent call records for the customer base on a watch-by-watch, billing-cycle-by-billing-cycle basis.

WATCHDOG (402) also has two transaction based record files that WATCHDOG (402) stores in its memory for fact access. One file, the CHECKPOINT file (403) memory is a full backup record of the states in WATCHDOG'S (402) memory; this file is recreated every few hours and stored to storage media. In order to safeguard the record changes to this information, the second file, the CHANGE LOG file (404) is made and the old is archived and deleted.

As described previously, the monitoring, filtering and call rating preprocessor (400a) within the applications processor (200) reads the phone call record, translates it into a message format (message header and organization of data compatible with system (400b)) and rates the call. This is based upon standard toll and/or a special charge schedule that the telephone company has assigned to that account, usually a variant on flat, stepped, or recursive charge rates. This is important, as it allows the cellular carrier to assign multiple plans to any variety of accounts. This rated call record is handed off to the database processor (400b).

Figure 6A:
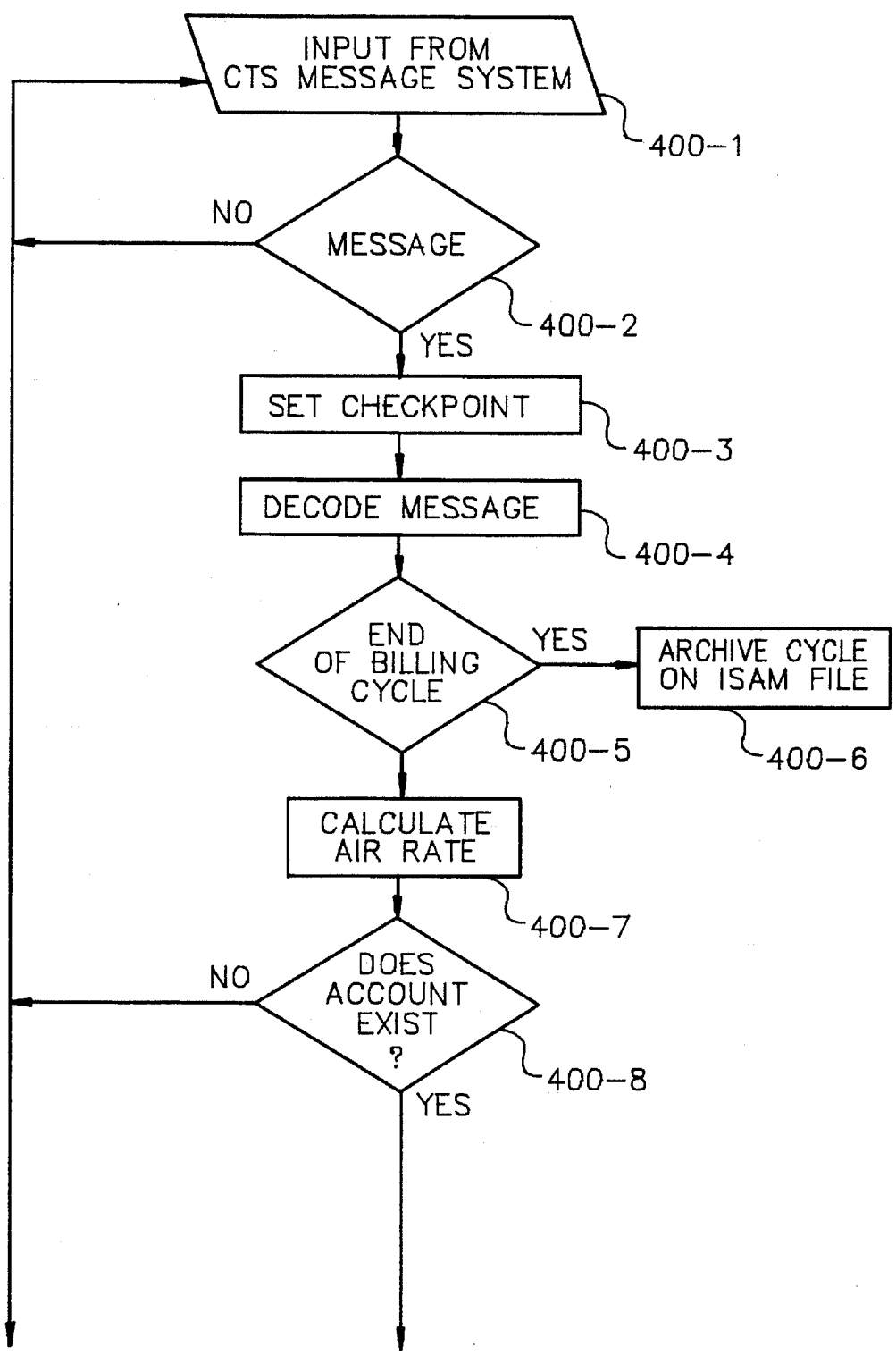
FIGS. 6a, 6b, and 6c are the program flowchart for the database processor of FIG. 5.
Figure 6B:
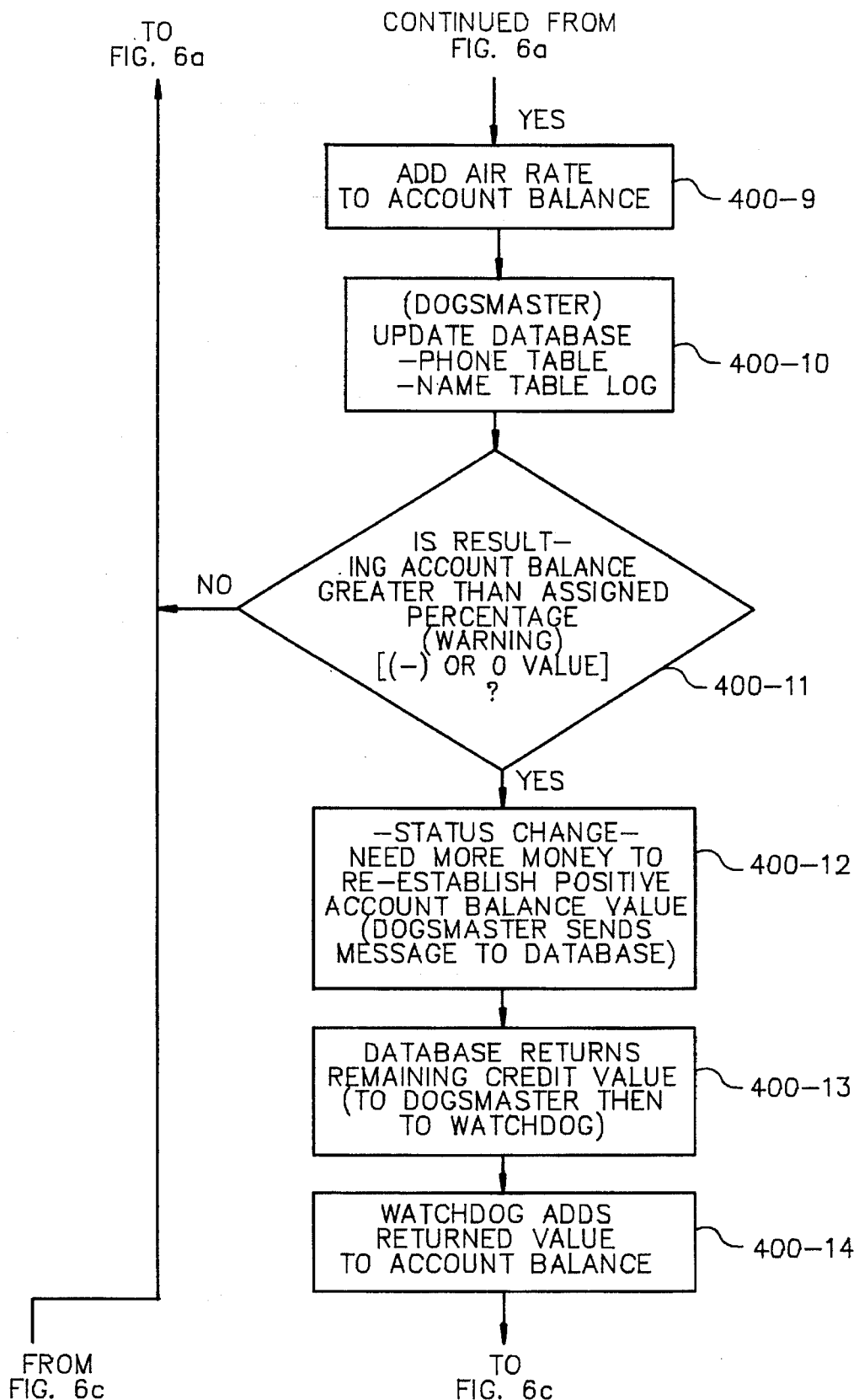
Figure 6C:
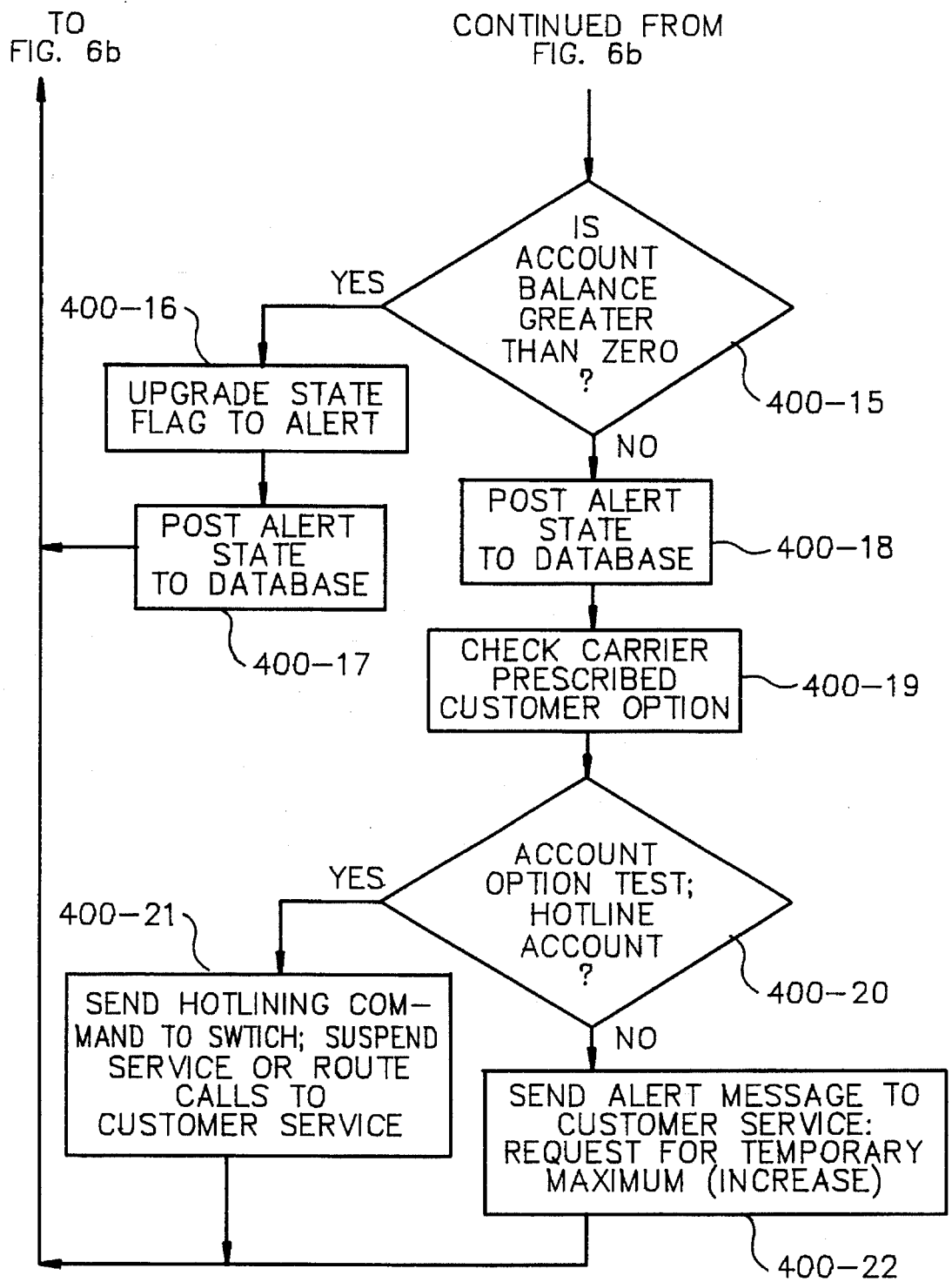

The overall processing operations of database processor (400b) are shown in the flow chart of FIGS. 6a, 6b and 6c. As indicated in FIG. 6a, WATCHDOG (402) processes the incoming call data received from the applications processor (200). In general it stores call records in the ISAM files (405). It calculates air time charges for all rated call records of all active customer accounts registered with the system (400). It also cooperates with DOGMASTER (406) as shown in FIG. 6c and issues warning and alerts as the condition of accounts warrant.

The WATCHDOG (402) program more specifically as shown in FIGS. 6a, b, c, 7a, 7b and receives system messages (400-1) sent by all of the other programs including the monitoring, filtering and rating programs of the applications processor (200), the DOGSMASTER program (406), the BILLCYCLE program (407), and the CLOSER program (409), from the messaging system (401). When WATCHDOG (402) receives a message (400-2) from a program in the applications processor (200). At (400-3) CHECKPOINT (403) checks its internal memory, to ensure a full backup record of all of the values and states in its memory. It then proceeds to decode the message (400-4), and split the message string into its component parts. It then looks for end of billing cycle at (400-5) and if so archives cycle on ISAM file (400-6). Then it calculates the air rate (duration of the call multiplied by the rate plan variable) (400-7) and adds the appropriate amount of tax. It then checks its memory to determine whether or not the account is registered with the system by looking at database (408a) and gets account number, rate plan, phone number, balance and phone history information on the account (400-8). WATCHDOG (402) then adds the computed charges (400-9) to the balance of the account causes DOGMASTER (406) to update database (408a) at (400-10), and compares this resulting value with the value that was set for it as a prewarning alert (400-11). If the resulting balance is less than the value set for the prewarning alert indicated by NO at (400-11), then the predetermined conditions or relationship of usage to stored limits are all right and WATCHDOG (402) looks for the next message in the queue of messaging system (401).

Figure 8:
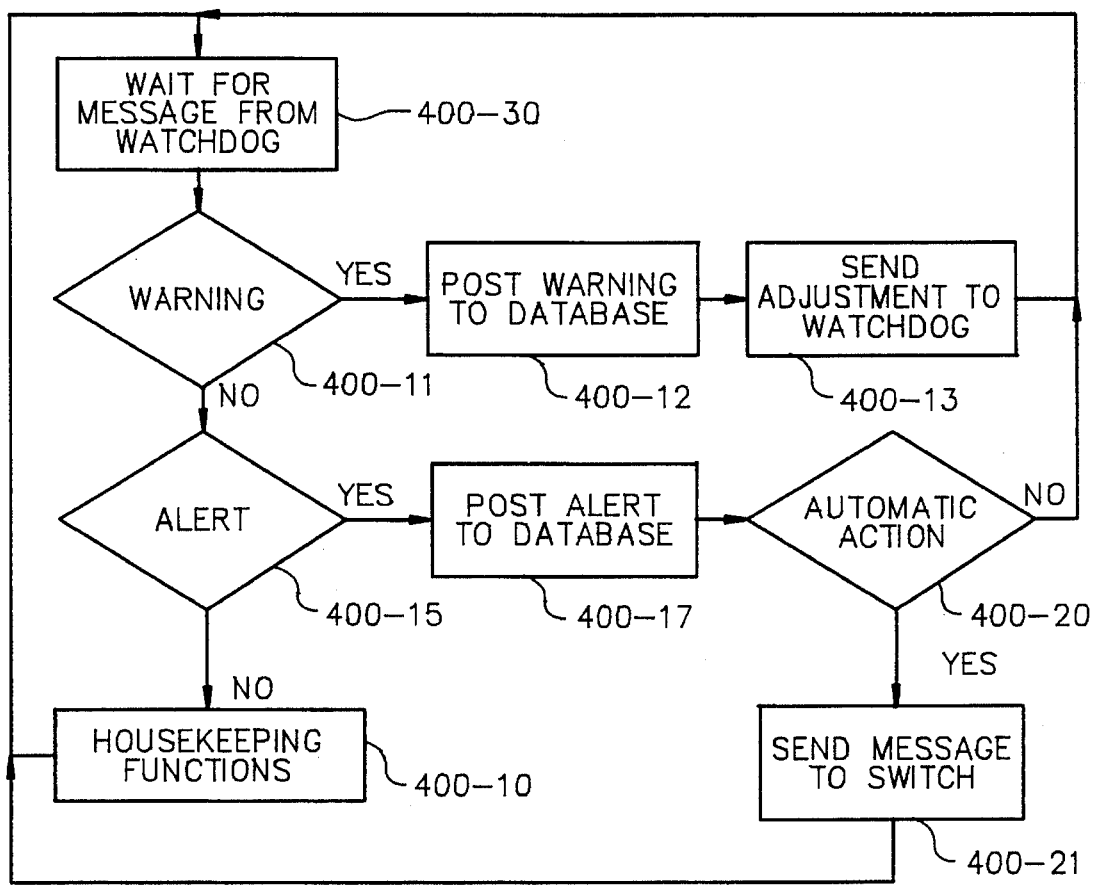
FIG. 8 is the program flowchart for a program called DOGMASTER, a portion of the system of FIG. 5.

If the resulting value at (400-11) of FIG. 6b is equal to or greater than the value set for the prewarning alert, namely a predetermined or set percentage of the total allocation for that account, then the resulting balance goes to zero or negative and action is required. The WATCHDOG (402) then sends a message to DOGSMASTER (406), advising DOGMASTER (406) of a status change. At this point, WATCHDOG (402) sends a message to DOGSMASTER (406), informing DOGSMASTER (406) that the account has a negative balance (400-12). As shown in the flowchart of FIG. 8, DOGSMASTER (406) looks at the database (408a) to determine the limits on the cellular subscriber's account, based on the cellular carriers predefined plan. If the message from WATCHDOG (402) is a warning, DOGSMASTER (406) will solve the ALERT by releasing (400-13) the remainder of the billing cycle credit limit to the cellular subscriber's working balance (400-14), bringing the account back to a positive value (400-15) and allowing service to continue at YES. WATCHDOG (402) updates the state flag on the account to (406-16) the status of ALERT and at (400-17) DOGMASTER (406) will also post the ALERT warning on the account in the database, which will be seen by customer service.

In the event that the customer exceeds the predetermined account credit limit, WATCHDOG (402) again notifies DOGSMASTER (406) at (400-15) with a NO output that the account has dropped into a negative balance state and the state flag is set to a POST-ALERT state at (400-18). In the event of the condition where the customer's charges exceed the allotted account for the month, resulting in an alarm condition, WATCHDOG (402) sends a message to DOGSMASTER and an ALERT message is sent through AHOT interface (408b) to the terminals and printer in the customer service center. The alarm messages are preferably real time or may be batched at determinable intervals. DOGSMASTER (406) looks at the database for carrier predefined action or actions to take in this event (400-19). These actions could be to (a) hotline the account (400-20), which would either be the suspension (400-21) of cellular account service, or the routing of all cellular outgoing service to the credit and collection department which incoming cellular calls would receive a no-working number message, or (b) the posting of an alert to the database, which will require a customer service decision (400-22), whether to set a temporarily higher account maximum and attempt to contact the customer, or to suspend service. At this point, the customer service officials have alternative courses of action other than to just let the customer build up large unpayable bills.

Figure 7A:
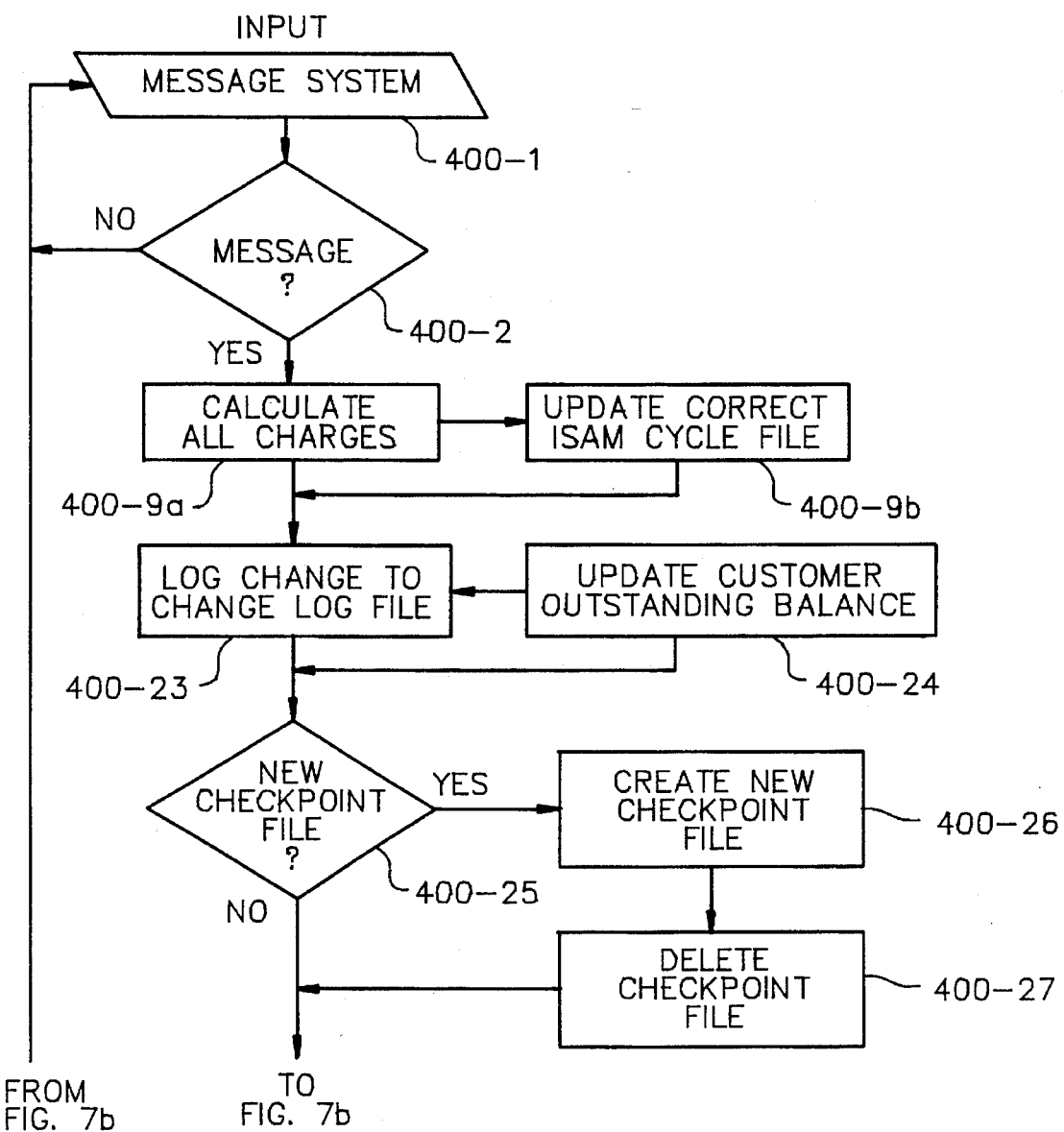

With reference to FIGS. 7a, 7b and 8, WATCHDOG (402) is shown to use the ISAM cycle file (405) at (400-9b) and the transaction record files CHECKPOINT (403) and CHANGE LOG (404) at (400-24) and (400-25), respectively, to store charges computed at (400-9a) (see FIG. 6c), update customer balance at (400-24), create new and delete existing checkpoint file at (400-26), (400-27) as directed by decision at (400-25), and perform balance comparisons (400-11); (400-15), and send to DOGSMASTER (406) WARNINGS and ALERTS at (400-12) and (400-16). DOGSMASTER (406) performs all the database input and output for WATCHDOG (402). The DOGSMASTER (406) program checks the message queues at (400-30) of system (401) for modifying database messages from WATCHDOG (402); when the DOGSMASTER (406) receives a message at (400-30) from WATCHDOG (402) to update the UNIFY database (408a), DOGSMASTER (406) performs the specified updates at (400-12) and (400-17). It also determined whether to perform the automatic action at (400-20) and sends that message to the MTSO switch at (400-21) as described above for FIG. 6c.

Figure 9:
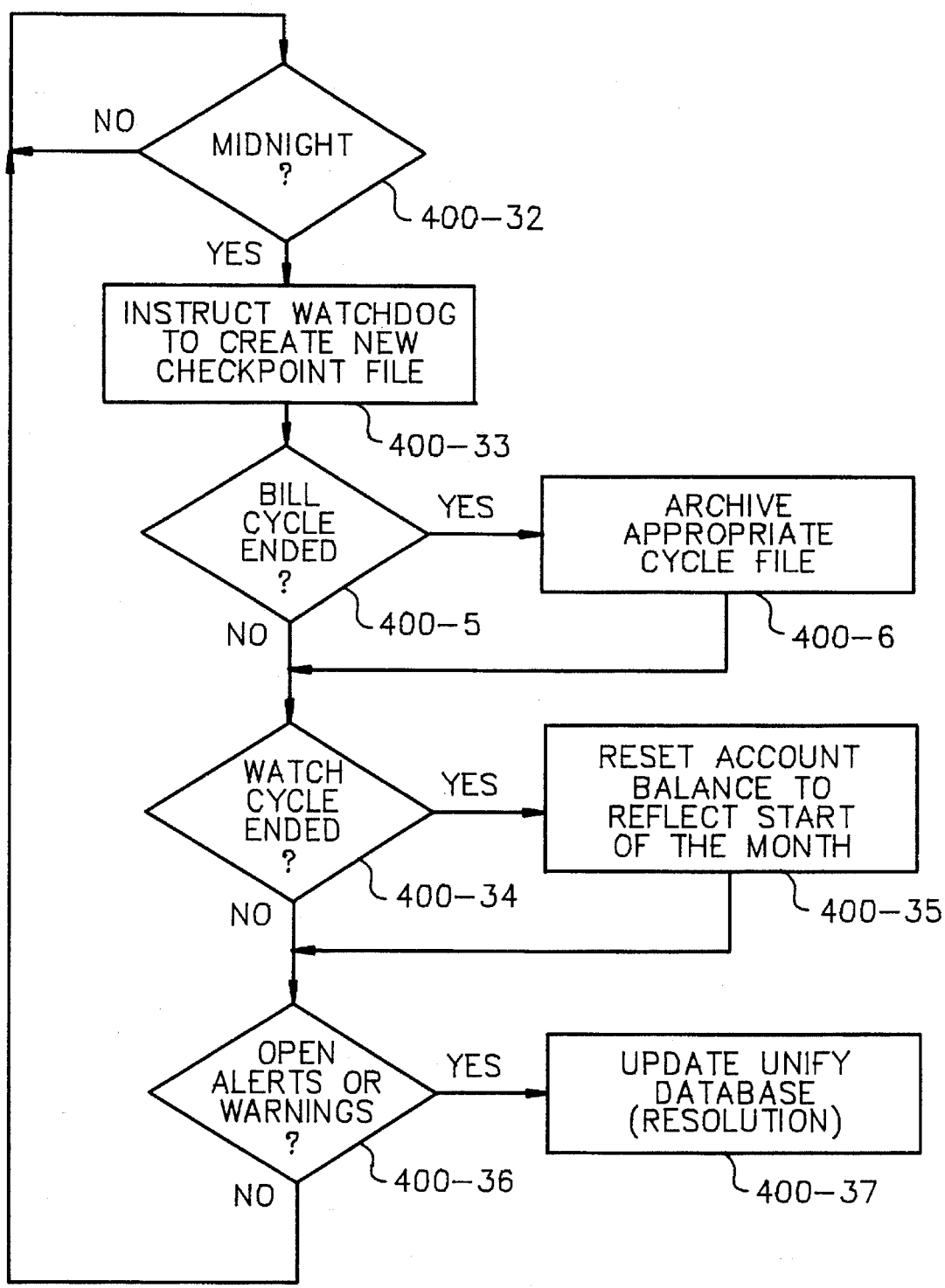
FIG. 9 is the program flowchart for the BILLCYCLE program, a portion of the system of FIG. 5.

As shown in FIG. 9, BILLCYCLE (407) performs the processing necessary at the end of each billing and watch cycle. The BILLCYCLE (407) program carries out the accounting functions at the end of the billing cycle, running every night at midnight (400-32). BILLCYCLE (407) first sends a message through the queue of messaging system (401) to the WATCHDOG (402), instructing at (400-33) the WATCHDOG (402) to create a new CHECKPOINT file (403) and BILLCYCLE(407) examines the old CHECKPOINT file (403) and retrieves the transaction information from WATCHDOG'S (402) memory also at (400-33). When BILLCYCLE (407) determines that a billor statement cycle has ended (400-5) it instructs WATCHDOG (402) to archive (400-6) that particular (ISAM) cycle (405). When BILLCYCLE (407) determines that any customer's watch cycle has ended at (400-34), it sends a message through the message queues (401) to WATCHDOG (402), instructing WATCHDOG (402) to reset (400-35) that customer's balance to reflect the beginning of a new watch cycle. In the case of a running balance option, there will be no cycle closings. BILLCYCLE (407) also updates the UNIFY database (408a) to bring any open alerts or warnings detected at (400-36)for the customers to resolution at (400-37). BILLCYCLE (407) may then also generate a report at the end of the cycle, which it may send to a file that the cellular subscriber may use to generate invoices for billing.

Figure 10:
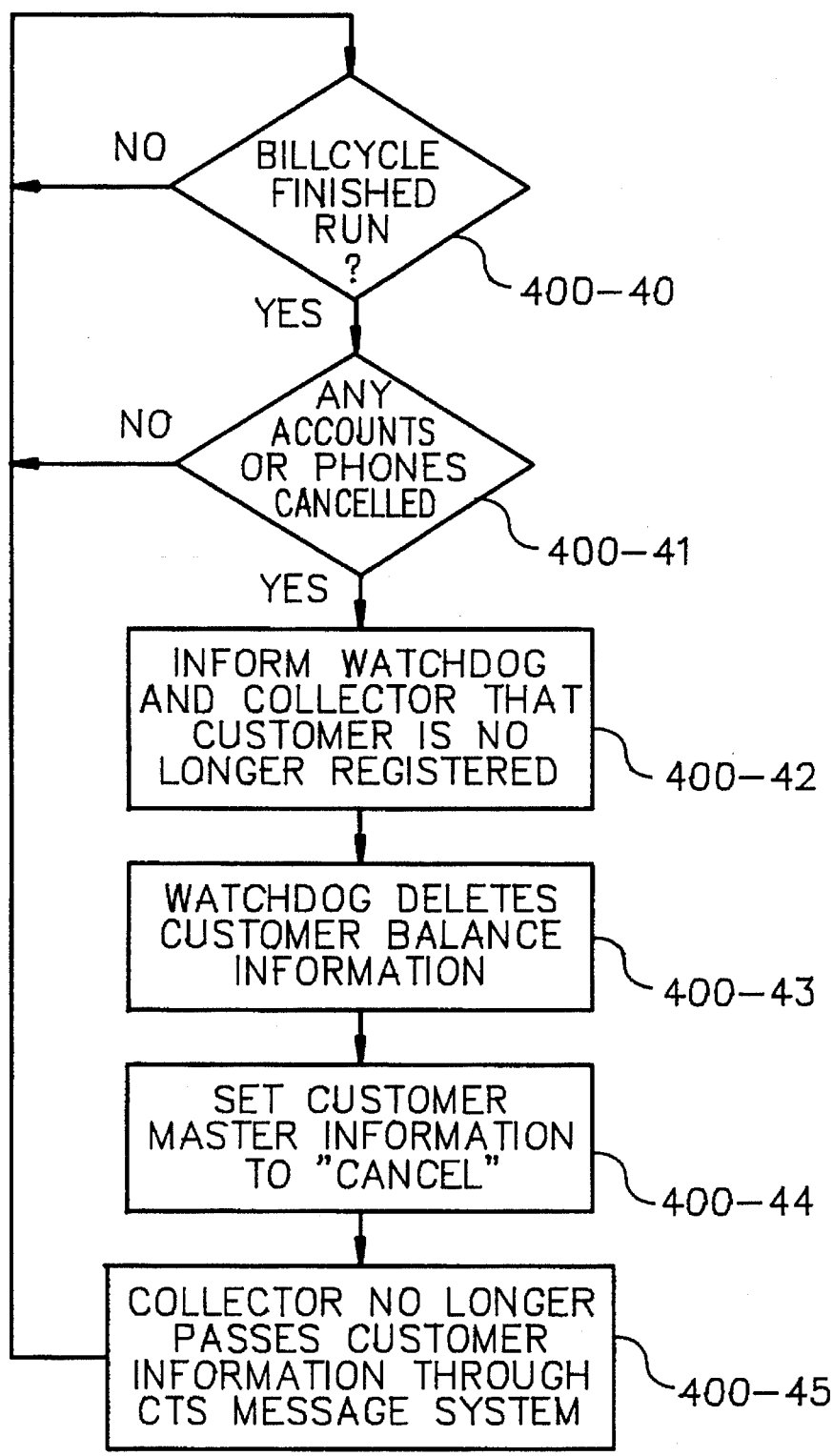
FIG. 10 is the program flowchart for a CLOSER program, a portion of the system of FIG. 5.

After the BILLCYCLE (407) program has run as determined at (400-40), the CLOSER (FIG. 10) program is run to look for any customer telephones or accounts which have been cancelled (400-41) for any reason. The CLOSER (FIG. 10) program then sends messages through the message queue (401), instructing both the applications processor (200) and WATCHDOG (402) that these customers are no longer registered in the system at (400-42). The Applications Processor (200) will then no longer pass call information at (400-45) for the customer through the message queue (401), and WATCHDOG (402) will delete the customer's balance information from the memory at (400-43). The Customer's matter information remains on the database but is set to "cancel" at (400-44), to prevent unauthorized use.

Real Time Monitoring and Control

The primary feature of this invention is that it enables the real-time collection of data from the cellular switch (103) and real-time control of the database that determines current service for subscriber stations or customers (101).

Real-time data collection is accomplished by establishing a direct connection between the switch's automatic message accounting program (110) and the control system (400) (FIGS. 2 and 5) including a database (408a) of customer specific accounts and having usage analysis processing to control credit limits.

On switches where the manufacturer has no provision for real time data collection, a direct interface to magnetic tapes drives where call data is logged is required. In this case, real-time data collection is still accomplished through the installation of passive tape taps installed in a manner known per se, between the switch's automatic message accounting program 110 and the switch's tape drives (not shown).

Alternative Embodiments

Figure 11:
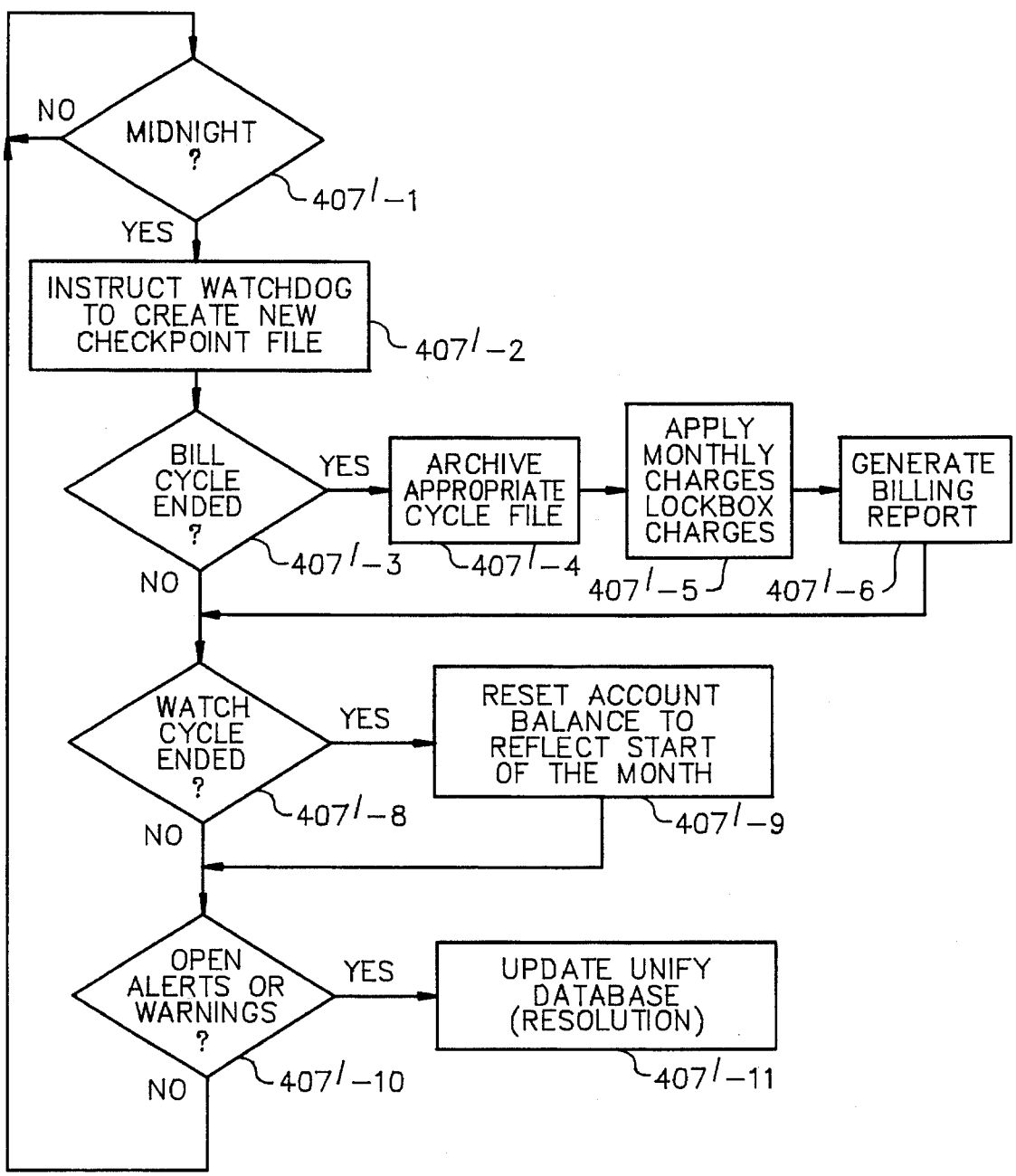
FIG. 11 is the flowchart for an alternative to the FIG. 9 BILLCYCLE program.

As shown in FIG. 11, the database processor of FIG. 5 may have a modified bill cycle program (407') that generates bill reports in conjunction with database (408a) and interface (408b) using printers at customer service (500) to print customer bills. As shown at midnight (407'-1), WATCHDOG (402) is instructed to create a new CHECKPOINT FILE (403) at (407'-2), and looks for end of BILLCYCLE at (407'-3). If YES, then the cycle file is archived at (407'-4), applies Monthly and Lock Box charges (407'-5) and generates Billing Report (407'-6). Then the alternative BILLCYCLE (407') looks for end of WATCHCYCLE at (407'-8) and if YES, resets account balance at (407'-9). If NO, the processing looks for OPEN ALERTS or WARNINGS at (407'-10), and if they are found (YES) then UPDATES UNIFY DATABASE (RESOLUTION) at (407'-11).

While only particular embodiments have been disclosed herein, it will be readily apparent to persons skilled in the art that numerous changes and modifications can be made thereto, including the use of equivalent devices and method steps, without departing from the spirit of the invention.

What is claimed is:

1. In a cellular telephone system comprising mobile telephone transceiver units operated in conjunction with cell sites and mobile telephone switching offices (MTSOs) which route calls to and from the mobile transceiver unit through a public switched telephone network (PSTN) and which generate call records, the method of automated monitoring and analyzing customer usage in substantially real time, comprising the steps of:

collecting through an applications processor linked to the MTSO customer call records by real time filtering of call records generated at the MTSOs;

rating in the applications processor each customer call and adding such rating data to each said customer call record;

calculating in a call record monitoring and analyzing processor total charges for each customer call;

storing account balances for each customer in said monitoring and analyzing processor;

adding said total charges for each customer call to said account balance in said monitoring and analyzing processor;

storing in a data base an authorized usage level for each customer in said monitoring and analyzing processor;

comparing over a predetermined watch cycle said account balance with said stored usage level in said data base for each customer after said step of adding said total charges to said account balance;

storing in said data base one or more of a plurality of selectable predefined actions for each customer to be invoked as a response to the step of comparing;

generating an action signal in said monitoring and analyzing processor when the step of comparing results in a predetermined percentage relation of said account balance to said stored usage level; and periodically resetting said account balance after each said predetermined watch cycle.

2. The method of claim 1, further comprising the step of changing customer service at the MTSO when said action signal is generated.

3. The method of claim 2, wherein said step of changing customer service includes automatically terminating service at the switch of the MTSO.

4. The method of claim 2, wherein said step of changing customer service includes automatically rerouting customer calls at the switch of the MTSO.

5. In the cellular telephone system of claim 1, said step of periodically resetting said account balance being performed by a bill cycle processor that further comprises the step of checking for said action signals occurring during said watch cycle and storing same.

6. Automated real time monitoring, analyzing and usage control system for mobile telephone subscribers in a cellular telephone network, comprising:

relational data base means for storing customer registrations, predetermined customer usage levels, account balances, and account action data including a plurality of selectable predefined actions for each of a plurality of predetermined customers;

means for monitoring in substantially real time accumulative actual usage by each of said predetermined customers by processing record data generated by a mobile telephone switching office, said processing of record data including means for rating each call and means for calculating total charges for each call;

means for comparing in substantially real time said accumulative actual usage with said predetermined customer usage level over a predetermined watch cycle for each of said predetermined customers;

means responsive to said means for comparing for generating an action signal when said accumulative actual usage over said predetermined watch cycle has a predetermined relation to said customer usage level for each of said customers;

means for retrieving said account action data from said relational data base means in response to said action signal; and means for resetting said accumulative actual usage after each predetermined watch cycle.

7. The system of claim 6 wherein said means responsive to said means for comparing comprises processor means for generating said action signal when said accumulative actual usage equals or exceeds said predetermined customer usage level for each of said predetermined customers during said predetermined watch cycle.

8. The system of claim 6, wherein said means responsive to said means for comparing comprises warning means for generating a warning signal in response to the occurrence of said action signal.

9. The system of claim 6, wherein said means for retrieving said account action data further comprising means adapted to cause a change in the condition of customer service at a mobile telephone switching office in response to said action signal.

10. The system of claim 6, further comprising applications processor means adapted to send a command to a mobile telephone switching office responsive to said action signal to direct outbound calls of said predetermined customers to an administrative office phone line.

11. The system of claim 6, further comprising means adapted for integrity switching of predetermined customers at a mobile telephone switching office and being responsive to said action signal for causing a mobile telephone switching office to disable a predetermined customer's service.

12. The system of claim 6, further comprising an applications processor linked to a mobile telephone switching office call record message processor, and said applications processor including means for collecting in substantially real time call record data for each predetermined customers placing or receiving calls through said mobile telephone switching office.

13. In a cellular telephone system having a switching office for selectively connecting certain predetermined mobile telephone user customers to other telephone stations and said switching office having a processor including an automatic message accounting program for responding to telephone calls to generate a call record for each such call, in combination therewith, a substantially real time usage monitoring and usage control subsystem comprising:

call record processor means for receiving said call data records and producing rating data for each call, and assembling multiple call data records including rating for each call into a data stream; and usage monitoring and control processor means including a data base means storing predetermined customer identification, action data including a plurality of selectable actions, preset usage data and a customer account balance, said usage monitoring and control processor means including means for computing and accumulating total call charges for each customer in response to said data stream and adding said total charges to said customer account balance, means for comparing in substantially real time accumulated total charges over a predetermined watch cycle with said preset usage data for each of said predetermined customers, means for generating an action signal in response to said means for comparing resulting in a predetermined percentage relation of said customer account balance and said preset usage data, means for retrieving said action data in response to said action signal, and bill cycle processor means for resetting said account balance for each customer at the beginning of each watch cycle.

14. In the telephone system of claim 13, further comprising means for sending a switch change signal to the switching office in response to said action signal.

15. In a telephone system of claim 13, wherein said bill cycle processor further includes means for checking for occurrence of action signals during said watch cycle and storing such occurrences.

16. In a telephone system of claim 13, further comprising a closer processor operating in conjunction with said bill cycle processor means for closing accounts that have been cancelled, and deleting said customer identification and preset usage data from said database means.

17. In a telephone system of claim 13, further comprising a messages system means including a common memory area accessible to said call record processor means, usage monitoring and control processor means, and said bill cycle processor means, said messages system means for sending messages to designated processor means by attaching an identification header to each digital message that is placed in said common memory area for being picked up by a designated processor means.

* * * * *